United States Patent [19]

Himuro et al.

[11] Patent Number: 4,866,468
[45] Date of Patent: Sep. 12, 1989

[54] CONTROL DEVICE FOR DRIVING ZOOM LENS OF A CAMERA

[75] Inventors: Keiji Himuro, Tokyo; Takashi Hongoh, Kawasaki; Kenji Koyama, Yokohama, all of Japan

[73] Assignee: Ricoh Company, Ltd., Tokyo, Japan

[21] Appl. No.: 242,117

[22] Filed: Sep. 9, 1988

[30] Foreign Application Priority Data

Sep. 11, 1987 [JP] Japan .................. 62-226531

[51] Int. Cl.⁴ .............................................. G03B 3/10
[52] U.S. Cl. ................................................ 354/195.1
[58] Field of Search ........................ 354/195.1, 406

[56] References Cited

U.S. PATENT DOCUMENTS 4,777,508 10/1988 Aoshima ................ 354/195.1 X

Primary Examiner—Michael L. Gellner
Attorney, Agent, or Firm—Oblon, Spivak, McClelland, Maier & Neustadt

[57] ABSTRACT

A control device for driving a zoom lens of a camera, comprising; a moving mirror cylinder movable on an optical axis of the camera between a first position corresponding to the shortest focal length of the zoom lens and a second position corresponding to the longest focal length of the zoom lens, a motor for moving the moving mirror cylinder in a predetermined direction, a detector for detecting a position of the moving mirror cylinder on the optical axis, a presetter for presetting a predetermined position between the first position and the second position, the predetermined position at which the moving mirror cylinder to stop, a controller for controlling the motor such that the moving mirror cylinder at a high speed, a starter for starting an actuation of the controller, a stopper for stopping an actuation of the controller in a case where the moving mirror cylinder arrives at the first position, the second position or the predetermined position.

7 Claims, 9 Drawing Sheets

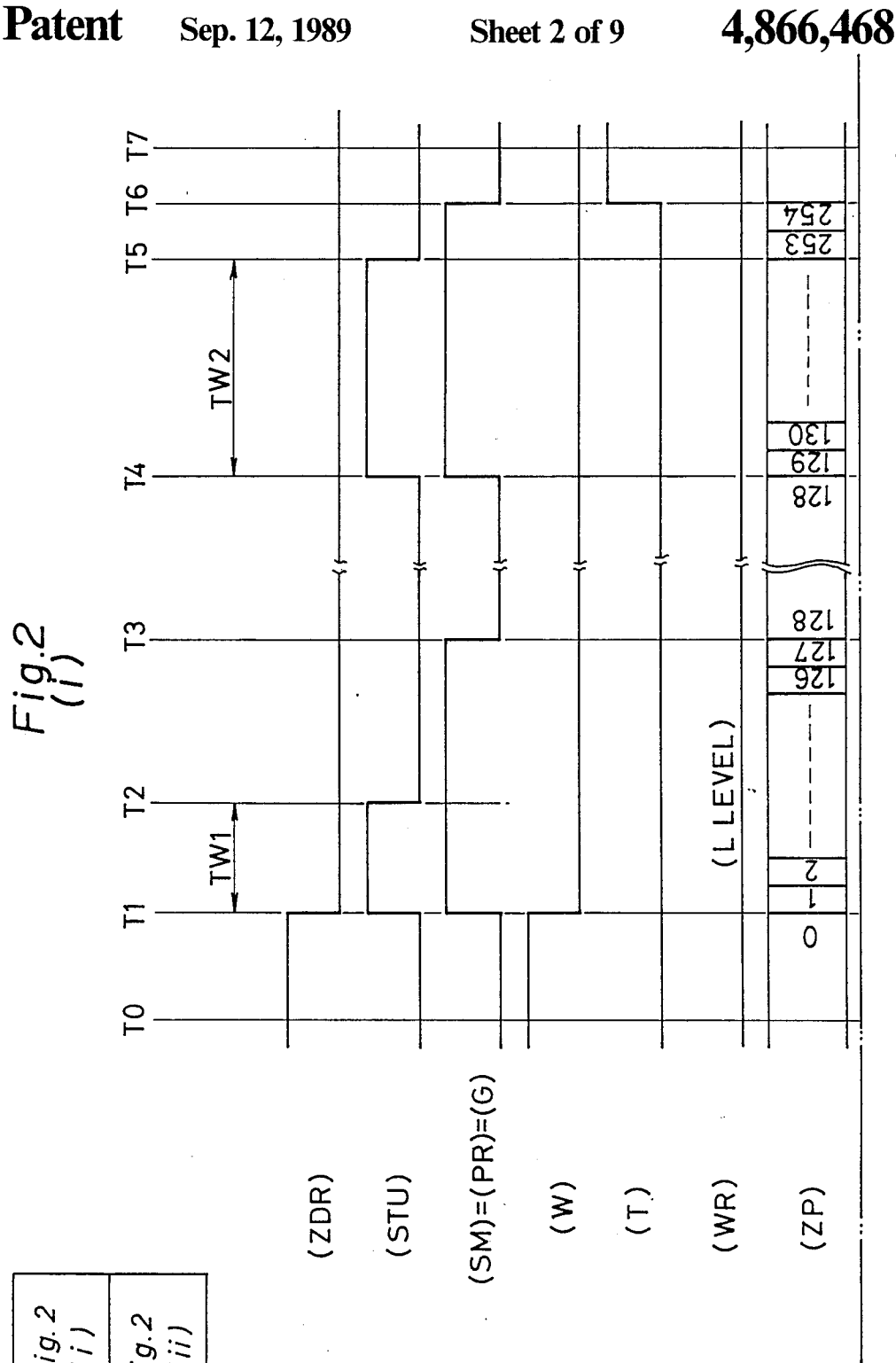

(ii)

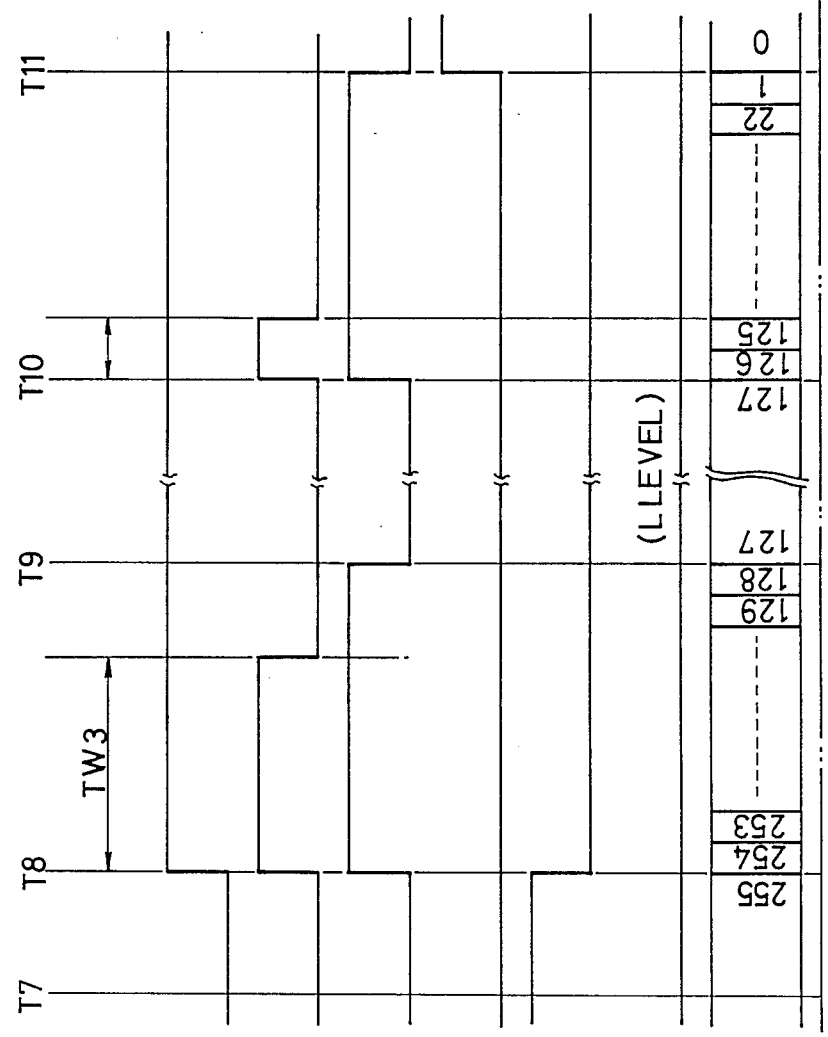

(ii)

CONTROL DEVICE FOR DRIVING ZOOM LENS OF A CAMERA

BACKGROUND OF THE INVENTION

The present invention concerns a control device for driving a zoom lens of a camera.

In recent years, as cameras have been designed to be operated electronically and moved electrically, their performance has become higher, and those cameras in which the focal length of the zoom lens can freely be set by one-touch operation from the longest focal length to the shortest focal length have been generally put to practical use. Accordingly, an operator (user) can easily set an angle of view optimum to an intended composition while visually observing an object through a finder. Heretofore, it has been adapted such that the zooming operation is continued for a period during manipulation to a zoom switch for actuating the zooming operation that changes the focal length, while the zooming operation is stopped when the manipulation is interrupted. That is, the operator can visually observe through the finder the image of the object that changes continuously while manipulating the zoom switch and, when an optimum size (view of angle) is attained for the image of the object, stop the manipulation to the zoom switch. Accordingly, a motor for driving the zoom lens has to operate at such a relatively slow speed as enabling the visual observation.

However, depending on the purpose of taking photographs, there is a case that such continuous change for the angle of view is not necessary but rather three finds of focal length, for example, the longest focal length (hereinafter referred to as "TELE position"), the shortest focal length (hereinafter referred to as "WIDE position") and a substantial intermediate position between the WIDE position and the TELE position are generally required and that these positions are intended to be switched rapidly. For instance, in a case of taking a photograph for the whole view of fireworks opening in the night sky or close-up views of individual brilliant points constituting the bursting fireworks until they are extinguished, there is a fear that a shutter chance may be lost by a relatively slow zooming operation as usual and, even if it can be photographed, the view of angle can no more satisfy the aim for the intended composition.

The object of the present invention is to provide a control device for driving a zoom lens of a camera capable of rapid zooming operation for switching the focal length while maintaining the usual operationability in an inexpensive and simple structure.

SUMMARY OF THE INVENTION

According to the present invention, the above mentioned object is attained by a control device for driving a zoom lens of a camera, comprising;

(a) a moving mirror cylinder movable on an optical axis of said camera between a first position corresponding to the shortest focal length of said zoom lens and a second position corresponding to the longest focal length of said zoom lens, (b) a moving means for moving said moving mirror cylinder in a predetermined direction, (c) a detecting means for detecting a position of said moving mirror cylinder on said optical axis, (d) a presetting means for presetting a predetermined position between said first position and said second position, said predetermined position at which said moving mirror cylinder to stop, (e) a first control means for controlling said moving means such that said moving mirror cylinder moves at a low speed, (f) an actuation means for actuating said first control means during a predetermined time period, (g) a second control means for controlling said moving means such that said moving mirror cylinder moves at a high speed, (h) a starting means for starting an actuation of said second control means, (i) a stopping means for stopping an actuation of said second control means in a case where said moving mirror cylinder arrives at said first position, said second position or said predetermined position.

According to the present invention, since it is adapted such that the moving mirror cylinder moves in the predetermined direction on the optical axis of the camera at a slow speed only during the predetermined time by the actuation means (the first zooming operation), and the moving mirror cylinder moves in the predetermined direction on the optical axis of the camera to the predetermined position at a high speed by the starting means and the stopping means, thereby momentarily switching the focal length on every manipulation of the starting means irrespective of the duration time for the manipulation (the second zooming operation), it is possible to provide a control device for driving the zoom lens of a camera capable of rapidly switching the focal length only by the simple manipulation to the starting means when setting to the second zooming operation while maintaining the advantage of the first zooming operation.

BRIEF DESCRIPTION OF THE DRAWINGS

FIGS. 2, 2(i), 2(ii), 3, 3(i), 3(ii), 4 and 5 are timing charts for explaining the operation of the embodiment shown in FIG. 1; in which FIG. 2 and FIG. 3 show the operation of the preset mode as a feature of the present invention;

FIG. 2 and FIG. 4 show the case in which a moving mirror cylinder is driven from the W position to the T position, while FIG. 3 and FIG. 5 show the case in which the moving mirror cylinder is driven, conversely, from the T position to the W position;

FIG. 6 and FIG. 7 are flow charts showing the operation sequence of a modified embodiment in which a portion of the embodiment shown in FIG. 1 is constituted with a microcomputer, in which FIG. 6 shows the reversing operation of a mode flag, and FIG. 7 shows an operation corresponding to the operations for the preset mode and the usual mode.

DETAILED DESCRIPTION OF THE INVENTION

The present invention is to be described by way of preferred embodiments referring to the accompanying drawings.

Figure 1:
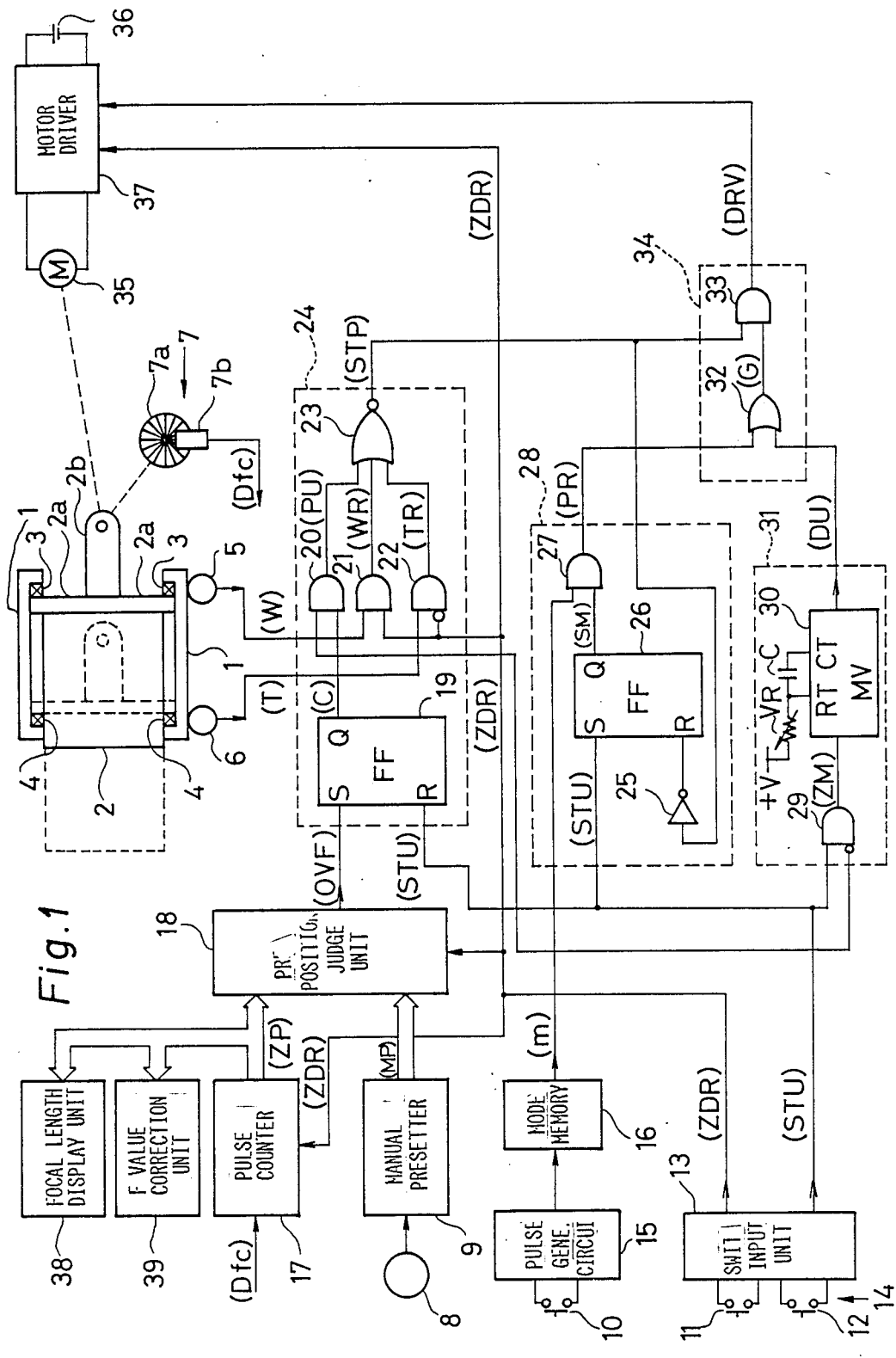
FIG. 1 is a block diagram showing the entire constitution of a control device for driving a zoom lens of a camera according to the present invention.

FIG. 1 is a block diagram showing the entire constitution of a control device for driving a zoom lens of a camera according to the present invention. In FIG. 1, are shown a fixed mirror cylinder 1 fixed to an immovable portion (not illustrated) of a camera, a moving mirror cylinder 2 fitted to the fixed mirror cylinder 1 so as to be movable in parallel therewith (leftwardly and rightwardly in the drawing), a flange 2a disposed to the rear end of the mirror cylinder 2, a driving arm 2b in contiguous with the flange 3 for moving the mirror cylinder 2, a W position stopper 3 disposed at the position of the rear end of the mirror cylinder 1 corresponding to the shortest focal length of the zoom lens (the position is hereinafter referred to as "W position"), a T position stopper 4 disposed at the position of the front end of the fixed mirror cylinder 1 corresponding to the longest focal length of the zoom lens 3 (hereinafter the position is the referred to as "T position"), and they are adapted such that the flange 2a stops at the W position shown by the solid line when it is abutted against the W position stopper 3, whereas it stops at the T position shown by the dotted line when it is abutted against the T position stopper 4. There are also shown a W position detection switch 5 that outputs a position signal (W) which takes H level when the mirror cylinder 2 is at the W position and takes L level in other cases than the above, a T position detection switch 6 that outputs a position signal (T) which takes an H level when the mirror cylinder 2 is at the T position and takes an L level in other cases than the above, a focus counter 7 as focal length detection means, a slit disc 7a rotationally driven along with the driving of the mirror cylinder 2 and a photointerrupter 7b for outputting pulses (Dfc) of a predetermined number along with the rotation of the slit disc 7, the disc 7a and the photo interrupter 7b constituting the focus counter 7.

Reference numeral 8 denotes a preset switch capable of external operation and 9 is a manual presetter that receives the output from the preset switch 8 and can set to any one of preset values (MP) 0 to 255 corresponding to the preset positions obtained by dividing the distance from the W position to the T position into 256 for instance as the setting position. The manual presetter 9 and preset switch 8 constitute stop position setting means.

Push button switches 10 to 12 each capable of external operation include a mode change switch 10, a WIDE switch 11 and a TELE switch 12 for driving the mirror cylinder 2 toward the W position and the T position respectively. A switch input unit 13 is adapted to receive the output from the WIDE switch 11 and the TELE switch 12 to output a zoom direction signal (ZDR) and be turned to and maintained at H level when the WIDE switch 11 is pushed and then turned to and maintained at L level when the TELE switch 12 is pushed, as well as output a status signal (STU) that rises to H level when either of the WIDE switch 11 or the TELE switch 12 is pushed (ON state) and falls to L level when either one of them is released (OFF state). The switch input unit 13 and the WIDE switch 11 and the TELE switch 12 constitute a zoom switch 14. A pulse generation circuit 15 is adapted to receive the output from the mode change switch 10 and output positive forwarding pulses (P) one by one on every pushing of the mode switch 10. A mode memory 16 comprises a T flip-flop that reverses the signal level at its output terminal at the rising edge of every positive forward pulses (P) when they are received, in which the mode signal (m) from the output terminal thereof shows the usual mode for conducting usual zooming operation when the signal is at L level, while shows the preset mode which is the characteristic operation in the present invention when the signal is at H level.

A pulse counter 17 is adapted to receive the pulse output (Dfc) from the photointerrupter 7a and receive the zoom direction signal (ZDR) and output a count value (ZP) which is sequentially added on every reception of the pulse output (Dfc) when the zoom direction signal (ZDR) is at L level, while output a count value (ZP) subtracted sequentially, on the contrary, when the signal is at H level in which the value ZP=0 when the mirror cylinder 2 is at the W position, while value ZP=255 when it is at the T position.

A preset position judging unit 18 (hereinafter referred to simply as "judging unit") is adapted to receive the count value (ZP) from the pulse counter 17 and the preset value (MP) from the manual presetter 9, compare these values to each other, as well as receive the zoom direction signal (ZDR) and output each one positive forward signal as a coincidence signal (OVF) when the relation $MP \leq ZP$ is satisfied if the zoom direction signal (ZDR) is at L level, whereas a relation $MP > ZP$ is satisfied when the signal is at L level respectively.

A set-reset type flip-flop 19 having a set input terminal S and a reset input terminal R of positive logic, as well as a non-inverted output terminal Q (hereinafter simply referred to as "FF", and other similar flip-flops are also simply referred to as "FF", not restricted FF 19) is adapted to receive the coincidence signal (OVF) at the set input terminal S and the status signal (STU) at the reset input terminal R. A positive logic 2-input type AND gate 20 is adapted to receive the mode signal (m) at the first input terminal and the output signal (c) from the FF 19 at the second input terminal, a positive logic 2-input type AND gate 21 is adapted to receive the position signal (W) at the first input terminal and the zoom direction signal (ZDR) at the second input terminal, a 2-input type AND gate 22 is adapted to receive the position signal (T) at the positive logic first input terminal and the zoom direction signal (ZDR) at the negative logic second input terminal, and a 3-input type NOR gate 23 is adapted to receive the output signals (PU), (WR) and (TR) respectively from AND gates 20, 21 and 22 at the positive logic first input terminal, second input terminal and third input terminal and output a stop signal (STP). FF 19, AND gates 20, 21, 22, NOR gate 23 constitute a stop judging unit 24. There are shown an inverter 25 adapted to receive the stop signal (STP), FF 26 adapted to receive the status signal (STU) at the set input terminal S, the output from the inverter 25 at the reset input terminal R and output an output signal (SM) from the non-inverted output terminal Q, a positive logic 2-input type AND gate 27 adapted to receive the mode signal (m) at the first input terminal, the output signal (SM) described above at the second input terminal and output a high speed signal (PR). The inverter 25, the FF 26 and the AND gate 27 constitute a high speed control unit 28. There are also shown a 2-input type AND gate 29 adapted to receive the status signal (STU) at the positive logic first input terminal, the mode signal (m) at the negative logic second input terminal and output a zoom operation signal (ZM), a multi-vibrator 30 (hereinafter simply referred to as "MV") adapted to receive the zoom operation signal (ZM) and operate only when the signal is at H level and output a usual speed signal (DU) at a duty ratio of about 50% in which the ON time (H level) and OFF time (L level) are about 10 ms respectively. A timing capacitor C is connected between the connection terminals CT and RT, while a variable resistor VR is connected between the connection terminal RT and a power source +V of MV 30, so that the duty ratio is changed by the variable resistor VR, and it is adapted such that when the zoom operation signal (ZM) is turned to H level, the usual speed signal (DU) always starts from the ON time. The MV 30, the timing capacitor C, the variable resistor VR and the AND gate 29 constitute a usual speed control unit 31. There are shown a positive logic 2-input type OR gate 32 adapted to receive the high speed signal (PR) at the first input terminal and the usual speed signal (DU) at the second input terminal and output an output signal (G), and a positive logic 2-input type AND gate 33 adapted to receive the stop signal (STP) at the first input terminal, the output signal (G) at the second input terminal and output a drive signal (DRV). The AND gate 33 and the OR gate 32 constitute an actuation control unit 34.

There are shown a motor 35 for driving the mirror cylinder 2 and the focus counter 7, a motor power source 36 for driving the motor 35, and a motor driver 37 adapted to receive the zoom direction signal (ZDR) and the drive signal (DRV) and supply the current from the motor power source 36 to the motor 35 when the drive signal (DRV) is at H level, while disconnect the supply of the current when the signal (DRV) is at L level and also adapted to connect the motor power source 36 with the motor 35 such that the motor 35 is rotated forwardly when the zoom direction signal (ZDR) is at L level, whereas connect the power source 36 with the motor 35 such that the motor 35 is rotated backwardly when the signal (ZDR) is at H level. The forward or backward rotation of the motor 35 corresponds to the driving of the mirror cylinder 2 toward the T position or the W position respectively.

Furthermore, there are shown a focal length display unit 38 for displaying the focal length and an F value correction unit 39 for correcting the F value, both of which receive the count value (ZP).

In the initial state, it is adapted such that the count value (ZP) is zero, the mode signal (m) is at L level, the zoom direction signal (ZDR) is at H level and the FF 19 and the FF 26 are reset, in which the mirror cylinder 2 is at the W position shown by the solid line.

Figure 2:
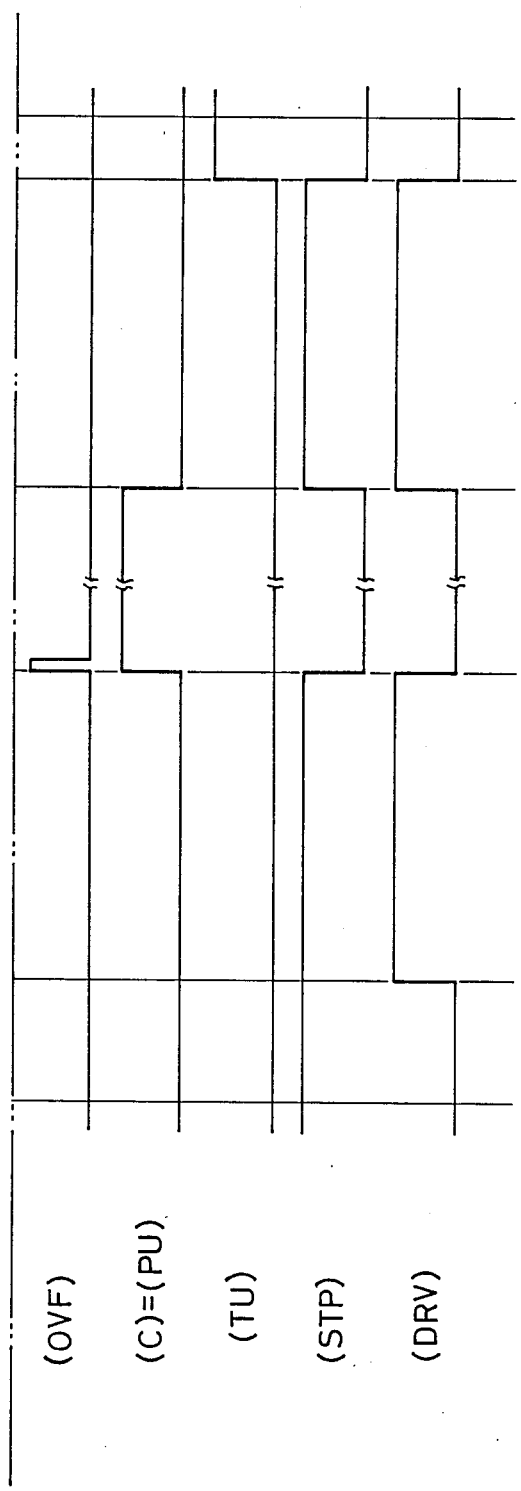
Figure 3:
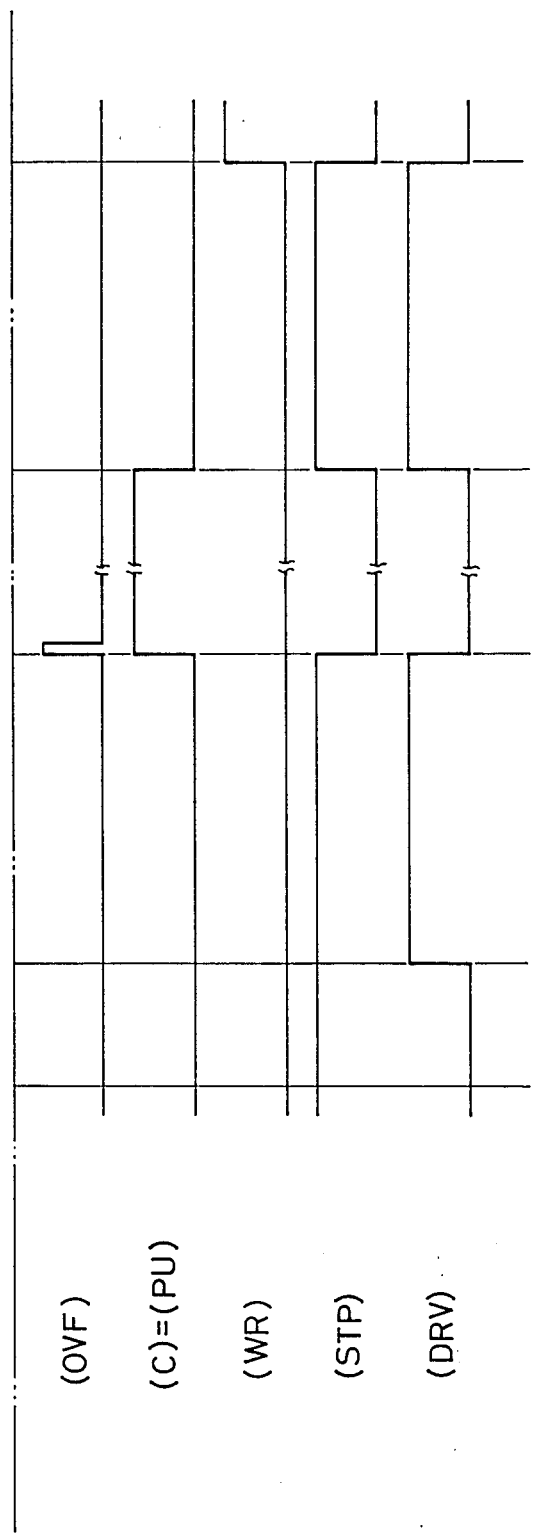
Figure 4:
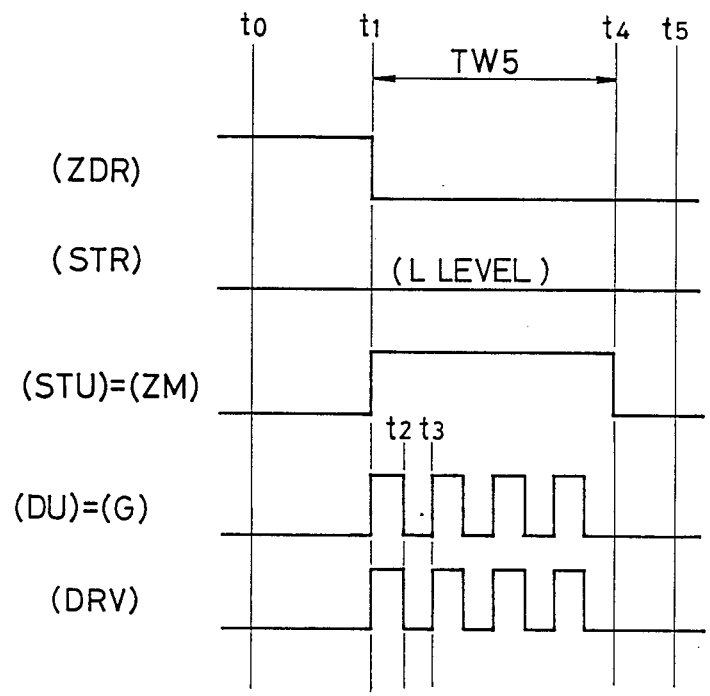
FIG. 4 and FIG. 5 show the operation of the usual mode.
Figure 5:
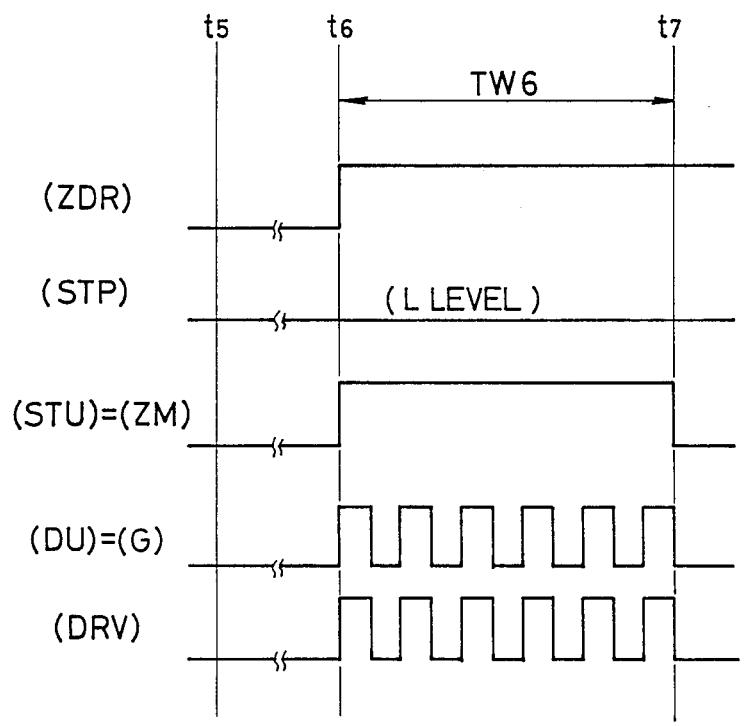

FIG. 2 through FIG. 5 are timing charts for explaining the operation of the embodiment shown in FIG. 1, in which FIG. 2 and FIG. 3 show the operation of the preset mode as the feature of the present invention, while FIG. 4 and FIG. 5 show the operation in the usual mode. Then, FIG. 2 and FIG. 4 show the cases where the mirror cylinder 2 is driven from the W position toward the T position, whereas FIG. 3 and FIG. 5 show the cases where the mirror cylinder 2 is driven from the T position to the W position.

The operation of the embodiment having thus been constituted is to be explained. The operation of the preset mode is at first referred to. Assuming that the each of the sections shown in FIG. 1 is at the initial stage, in which the preset switch 8 is manipulated to set the preset value (MP) of the manual presetter 9, for example, to MP=128 where the preset position is about at the intermediate between the W position and the T position.

Then, the mode change switch 10 is pushed only for once. In response to this pushing, the pulse generation circuit 15 outputs one shot of positive forwarding pulses (P) and the mode memory 16 turns the mode signal (m) from L level at the initial state to H level and maintains there. That is, the status is switched to the preset mode. Accordingly, the AND gate 29 is turned OFF, while the AND gate 27 is turned ON. Now, since the mirror cylinder 2 is at the W position in the initial stage, the TELE switch 12 is pushed. The instance is shown at T1 in FIG. 2. The period T0 to T1 indicates the initial stage. The zoom direction signal (ZDR) which has been at H level is turned to L level at the time T1, while the status signal (STU) rises to H level. Upon receiving the rising edge of the status signal (STU), the FF 19 is reset (although there is no substantial change since it has been already reset), while the FF 26 is set, by which the output signal (SM) is turned to H level, as well as the high speed signal (PR) and the output signal (G) are turned to H level respectively. Since all of the output signals (PU), (WR) and (TR) from the AND gates 20, 21 and 22 are at L level, the stop signal (STP) as the output from the NOR gate 23 is maintained at H level. As a result, since the AND gate 33 is turned ON, the high speed signal (PR) from the AND gate 27 is inputted as the drive signal (DRV) at H level to the motor driver 37 at the time T1. The motor driver 37, receiving this, causes the motor 35 to rotate forwardly in cooperation with the zoom direction signal (ZDR) now turned to L level. The mirror cylinder 2 is driven from the W position toward the T position at a high speed (comparison for the speed is described later) by way of the driving arm 2b and, accompanying therewith, the slit disc 7a of the focus counter 7 is rotated. Accordingly, the pulse output (Dfc) is outputted from the photointerrupter 7b and the pulse counter 17, receiving this, sequentially adds the count value as: ZP=1, ZP=2,—on every reception of the pulse output (Dfc) from the time T1 since the zoom direction signal (ZDR) is at L level. When the TELE switch 12 is released (stop pushing) at the time T2 after the elapse of time TW1 from time T1, the status signal (STU) is returned to L level. However, since the FF 26 maintains the set state, other signals are maintained at the state as described above. Now, the moving mirror cylinder 2 is further driven toward the T position, the pulse counter 17 advances the count value (ZP) as ZP=126, ZP=127, and the judging unit 18 sequentially compares this with the preset value (MP)=128 and judges as to if the condition MP≦ZP is satisfied or not sequentially since the zoom direction signal (ZDR) is at L level. Then, when the count value reaches ZP=128, since the above-mentioned condition is satisfied, the judging unit 18 outputs the coincidence signal (OVF) at the time T3. The FF 19 is set at the rising edge of the coincidence signal (OVF) causing the output signal (C) to rise, which passes through the AND gate 20 having been turned ON upon receiving the mode signal (m) at H level to form an output signal (PU). Accordingly, the stop signal (STP) is turned to L level upon rising of the output signal (PU) to turn the AND gate 33 to OFF, by which the drive signal (DRV) is fallen to L level to stop the motor 35 and to reset the FF 26 by way of the inverter 25 to be ready for the next operation and then return the output signal (SM) to L level. That is, the mirror cylinder 2 has been moved from the W position to the preset position. During the period T3 to T4, since the slit disc 7a is also stopped by the stopping of the motor 35 and the pulse output (Dfc) is not inputted from the focus counter 7, the pulse counter 17 maintains the count value at ZP=128 and the FF 19 maintains the set state. Accordingly, the output signals (C) and (PU) are maintained at H level and, as a result, since the stop signal (STP) and the drive signal (DRV) are maintained at H level, the motor 35 is kept stopped. Then, when the operator pushes the TELE switch 12 again at time T4, the status signal (STU) rises, the FF 26 is set to turn and maintain the output signal (SM) at H level, while the FF 19 is reset to turn and maintain the output signals (C) and (PU) at H level. As a result, the stop signal (STP) is turned to H level thereby causing the AND gate 33 to ON and the output signal (SM) turned to H level in the same manner as described above turns the drive signal (DRV) to H level, thereby causing the motor 35 to rotate forwardly, by which the mirror cylinder 2 is driven from the preset position further to the T position. Even if the TELE switch 12 is released at time T5 after the elapse of time TW2 from time T4, only the status signal (STU) is returned to L level with no changes for other signals as described previously. The pulse counter 17 adds the count value as ZP=129, 130, --- from time T4 and, when ZP=254 is counted to reach ZP=255, the flange 2a of the mirror cylinder 2 abuts against the T position stopper 4 and the position signal (T) from the T position detection switch 6 is turned to H level. The position signal (T) passes through the AND gate 22 which has been turned ON by the application of the zoom direction signal (ZDR) at H level at the second input terminal to form the output signal (TR). Finally, the stop signal (STP) is turned to L level at the rising of the position signal (T) to turn the AND gate 33 to OFF and stop the motor 35 at time T6 in the same manner as described previously. That is, the mirror cylinder 2 is automatically moved at a high speed from the W position to the preset position by the manipulation for the first time at the time T1 and moves in the same manner from the preset position to the T position by the second manipulation at time T4 irrespective of the duration of the manipulation time TW1 and TW2 for the pushing to the TELE switch 12.

The operation from the T position toward the W position is substantially the same as has been described above and only the difference is to be simply explained.

In FIG. 3, time T7 is assumed identical with time T7 in FIG. 2. Then, if the WIDE switch 11 is pushed at time T8, the zoom direction signal (ZDR) is turned to H level and the status signal (STU) is maintained at H level during the manipulation time TW3. The motor driver 37 causes the motor 35 to rotate backwardly, by which the mirror cylinder 2 is driven from the T position toward the W position. The pulse counter 17 starts subtraction sequentially from the count value: ZP=255. Upon receiving this, the judging section 18 outputs the coincidence signal (OVF) at time T9 at which MP>ZP, to stop the motor 35 and thus stop the mirror cylinder 2 at the preset position. Then, when the WIDE switch 11 is pushed from time T10 for the manipulation time TW4, the mirror cylinder 2 starts its movement again from the preset position toward the W position. Then, when the count value reaches: ZP=0 at time T11, the flange 2a abuts against the W position stopper 3, by which the position signal (W) from the W position detection switch 5 is turned to H level, and the output signal (WR) from the AND gate 21 that has been turned ON by the H level zoom direction signal (ZDR) is turned to H level to stop the motor 35 finally at time T11 and, thus, stop the mirror cylinder 2 at the W position.

Then, the operation for the usual mode is to be described, in which the operations in common with those described above are omitted and only the difference is explained simply.

Now it is assumed that the state is in the initial stage (time $t_0$ to $t_1$ in FIG. 4). Accordingly, the AND gates 20 and 27 are OFF. When the TELE switch 12 is pushed at time $t_1$, the status signal (STU) rises to H level, which passes through the AND gate 29 having been turned ON, to form the zoom operation signal (ZM). The MV 30 repeats the operations in such a cycle as rising the usual speed signal (DU) at the time $t_1$ and maintained for 10 ms, falling to low level at time $t_2$, then again rising to H level at time $t_3$ and so on. The usual speed signal (DU) is outputted by way of the OR gate 32 and the AND gate 33 now turned ON as the drive signal (DRV). The motor driver 37 receiving this causes the motor 35 to rotate forwardly. However, since the motor 35 is driven by the drive signal (DRV) comprising the pulses of 50% duty ratio in the usual speed mode as compared with the continuous drive signal (DRV) in the preset mode as described above, the rotational speed of the motor, that is, the moving speed of the mirror cylinder 2 is at a usual speed lower than the preset mode. That is, in the case of the preset mode, since they are driven at 100% duty ratio, the maximum speed can be obtained. Now, at time $t_4$ after the elapse of the operation time TW5, if the TELE switch is released, the status signal (STU) and the zoom operation signal (ZM) are returned to L level, and MV 30 stops its operation and keeps the usual speed signal (DU) at L level. Accordingly, the drive signal (DRV) is also maintained at L level and the mirror cylinder 2 is also stopped at that position at time $t_4$.

FIG. 5 shows the driving toward the W position in the contrary to the above but, since the operation in this case can easily be considered from the foregoing explanations, the detailed descriptions therefor are omitted. Time $t_5$ in FIG. 5 is identical with the time $t_5$ in FIG. 4 and TW6 means the manipulation time to the WIDE switch 11.

In this way, in the usual mode, the mirror cylinder 2 is driven corresponding to the manipulation time TW5 or TW6 for the zoom switch 14, and the zoom lens is driven at such a somewhat slow speed that the operator can visually confirm the change in the angle of view.

On the contrary, in the preset mode, since the output signal (SM) is maintained at H level irrespective of the duration of the manipulation time TW1, TW2 or TW3, TW4 to the zoom switch 14 and drives the mirror cylinder 2 automatically at the highest speed from the W position to the preset position and, further, from the preset position to the T position, the focal length can be switched (changed) rapidly by one-touch operation to provide an advantage of easy operation in addition to the merit that there is less possibility of missing the shutter chance.

Furthermore, there is also a merit that the angle of view can be determined deliberately by the usual mode.

There is a further merit that the focal length can be displayed and the F value can be corrected by using the count value (ZP) of the pulse counter 17.

Further, since the manual presetter 9 can be preset to an optional position from the T position to the W position (at the degree of 256 division) by the preset switch 8, there is a merit capable of obtaining highly flexible operation.

The present invention is not restricted by the foregoing embodiment at all but various other modifications are possible within the scope not departing the gist thereof.

For instance, the pulse counter 17, the manual presetter 9, the judging unit 18, the stop judging unit 24, the pulse generation circuit 5, the mode memory 16, the high speed control unit 28, the switch input unit 13, the usual speed control unit 31 and the actuation control unit 34 shown in FIG. 1 may be constituted with a microcomputer (hereinafter referred to as "CPU"). In this case, the pulse generation circuit 15 and the mode memory 16 are replaced with a mode flag, while, the MV 30 of the usual speed control unit 31 is replaced with a timer.

Figure 6:
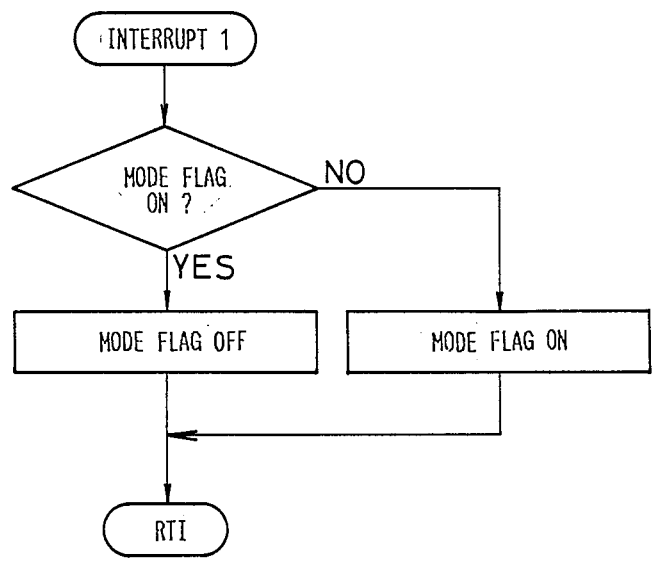

FIG. 6 is a flow chart for illustrating the mode flag reverse operation for switching the mode and the operation is started on every manipulation to the mode change switch 10. The content of the operation is such that the mode flag is turned OFF if it has already been ON and turned OFF if it has been ON. The mode flag ON represents the usual case and the mode flag OFF indicates the preset mode.

Figure 7:
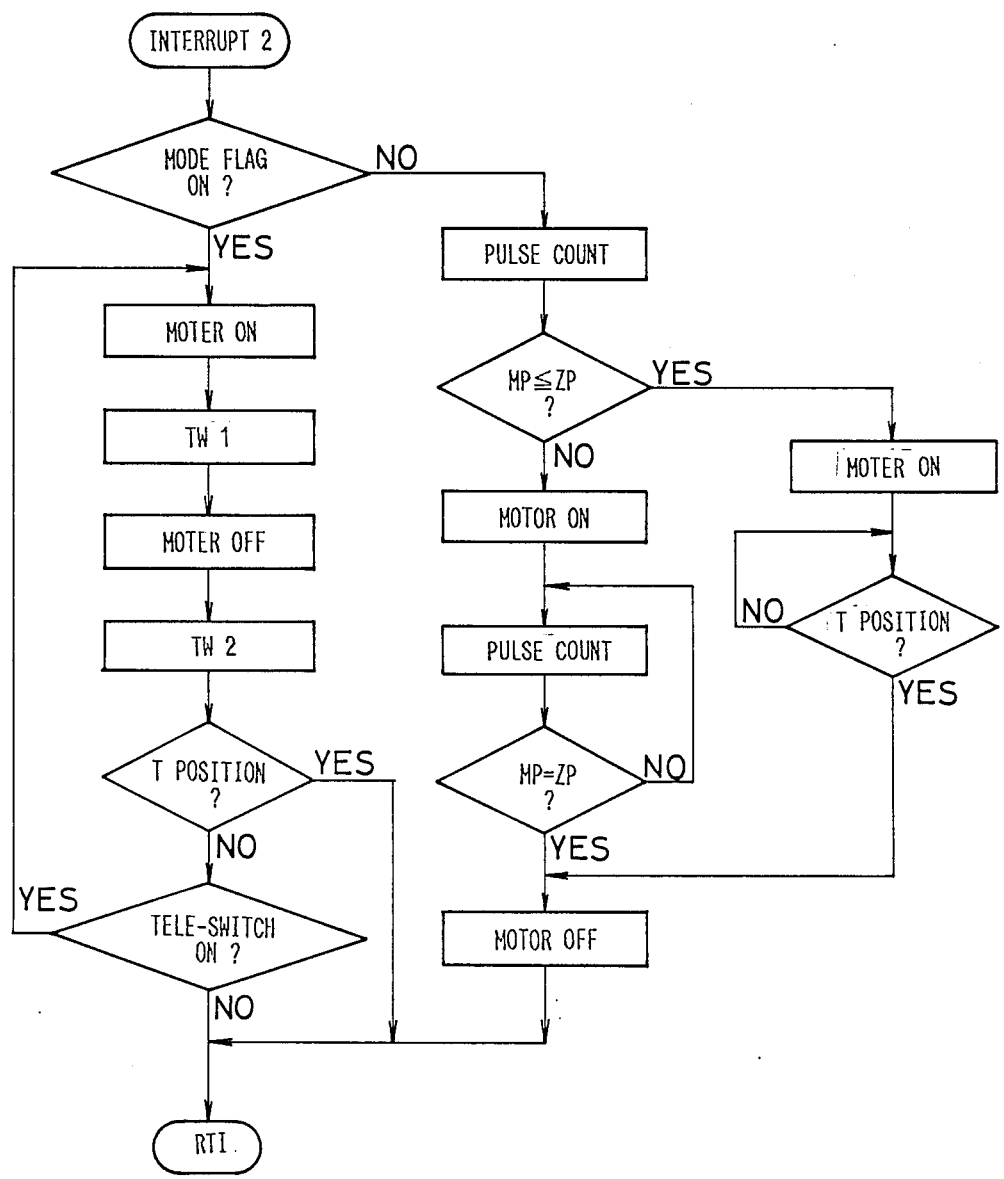

Then, FIG. 7 is a flow chart showing the operation of driving from the W position toward the T position and the system is started when the TELE switch 12 is manipulated. Assuming that the mirror cylinder 2 is at the W position and the mode flag is ON, when the TELE switch 12 is pushed, the step "mode flag ON?" is branched to YES and the drive signal (DVR) is turned to H level and the zoom direction signal (ZDR) is turned to L level thereby causing the motor to rotate forwardly at the step "motor ON". 10 ms is set to the timer at "TW1". Then, after elapse of 10 ms, the drive signal (DRV) is returned to L level to disconnect the current supply to the motor 35 at the next step "motor OFF" and 10 ms is set to the timer at "TW2". After the elapse of 10 ms, the signal level for the position signal (T) is checked at the step "T position ?". Assuming that the signal is at L level in this case, the step is branched into NO, and then branched to YES at the next step "TELE switch ON ?" recognizing that the TELE switch 12 is yet being pushed to branch into YES, again returned to the step "motor ON" and the same operations are repeated hereinafter till the TELE switch 12 is released or the mirror cylinder 2 reaches the T position. That is, the motor 35 is driven at 50% duty by so much as corresponding to the manipulation time in which the TELE switch 12 is urged.

While on the other hand, assuming that the mode flag is kept OFF, and the step "mode flag ON ?" is branched into NO, the pulse output (Dfc) is counted and the counted value is maintained at the next step "count pulse". Then, the step "MP≦ZP ?" is branched into NO judging that the mirror cylinder 2 has not yet reached the preset position, the drive signal (DRV) is caused to rise to H level to rotate the motor 35 forwardly at the step "motor ON".

Then, the next step "count pulse" is the same as described above and it is judged as to if the preset position has been reached or not at the next step "MP=ZP ?". The step is repeatedly branched to NO and repeats counting and judgment till the position is reached. If the position is reached, the step is branched into YES and the drive signal (DRV) is maintained to L level to stop the motor 35 at the step "motor OFF". That is, the zoom lens is moved from the W position to the preset position, then, if the TELE switch is pushed again, the step "mode flag ON ?" is branched into NO and, by way of the step "count pulse", the step "MP≦ZP ?" is branched into YES and then the motor 35 is rotated forwardly in the same manner as described above at the step "motor ON". Then, the position signal (T) is checked at the next "T position ?", and the step is repeatedly branched into NO till the position signal (T) reaches H level. When H level is reached, the step is branched into YES and the motor 35 is stopped at the step "motor OFF". That is, the mirror cylinder 2 is moved from the preset position to the T position.

Since the operations from the T position toward the W position can be easily considered based on the foregoing operations, the explanation therefore is omitted.

The duty ratio for the MV 30 in this embodiment is not restricted only to 50% and may be somewhat modified depending on the characteristics of the motor 35, etc. Furthermore, the ON time and the OFF time are not restricted to 10 ms but may be increased or decreased depending on the characteristics of the motor and the mechanical characteristics of the mirror cylinder 2, etc.

Furthermore, the preset value (MP) is obtainable not only by dividing the portion between the T position and the W position into 256, but the number of division may be varied depending on the accuracy to the present position and the constitution of the focus counter 7 and the pulse counter 17.

The operation of the pulse counter 17 is not restricted only to a constitution in which ZP=0 for the W position and ZP=255 for the T position, but the relation may be reversed. Furthermore, the pulse counter may be constituted such that it is cleared to zero on every arrival to the T position and the W position and reaches the count value ZP=255 at the respective contrary positions.

Furthermore, the forward rotation and the backward rotation of the motor 35 are not restricted only to the driving of the mirror cylinder 2 toward the T position and toward the W position, but they may be reversed.

What is claimed is:

1. A control device for driving a zoom lens of a camera, comprising;
    (a) a moving mirror cylinder movable on an optical axis of said camera between a first position corresponding to the shortest focal length of said zoom lens and a second position corresponding to the longest focal length of said zoom lens,
    (b) a moving means for moving said moving mirror cylinder in a predetermined direction,
    (c) a detecting means for detecting a position of said moving mirror cylinder on said optical axis,
    (d) a presetting means for presetting a predetermined position between said first position and said second position, said predetermined position at which said moving mirror cylinder to stop,
    (e) a first control means for controlling said moving means such that said moving mirror cylinder moves at a low speed,
    (f) an actuation means for actuating said first control means during a predetermined time period,
    (g) a second control means for controlling said moving means such that said moving mirror cylinder moves at a high speed,
    (h) a starting means for starting an actuation of said second control means,
    (i) a stopping means for stopping an actuation of said second control means in a case where said moving mirror cylinder arrives at said first position, said second position or said predetermined position.

2. The device of claim 1, in which said detecting means comprises a judging means for judging whether a position of said moving mirror cylinder corresponds to said predetermined position or not.

3. The device of claim 1, in which said detecting means comprises a slit disk, photo-interrupter and pulse counter.

4. The device of claim 1, in which said detecting means comprises a first position detecting switch for detecting that said moving mirror cylinder presents at said first position and a second position detecting switch for detecting that said moving mirror cylinder presents at second position.

5. The device of claim 1, in which said device further comprises a second setting means for setting said predetermined time period.

6. The device of claim 1, in which said device further comprises a second setting means for setting said predetermined direction.

7. The device of claim 1, in which said device further comprises another actuation means for actuating one of said actuation means and said starting means.

* * * * *